(12) United States Patent
    Cyr

(10) Patent No.: US 8,492,924 B2
(45) Date of Patent: Jul. 23, 2013

(54) POWER SUPPLY CONTROL METHOD AND STRUCTURE THEREFOR

(75) Inventor: Nicolas Cyr, Sainte-Foy de Peyrolieres (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 12/943,672

(22) Filed: Nov. 10, 2010

(65) Prior Publication Data

US 2011/0051469 A1 Mar. 3, 2011

Related U.S. Application Data

(62) Division of application No. 11/814,656, filed as application No. PCT/US2005/013552 on Apr. 21, 2005.

(51) Int. Cl.
    *H02J 1/00* (2006.01)
    *H02M 3/22* (2006.01)
    *H02M 3/335* (2006.01)

(52) U.S. Cl.
    USPC ................................ 307/31; 307/35; 307/151

(58) Field of Classification Search
    USPC .............................................. 307/31, 35, 151
    See application file for complete search history.

(56) References Cited

U.S. PATENT DOCUMENTS

| | | | |
|---|---|---|---|
| 4,556,805 A | 12/1985 | Shoji | 327/73 |
| 4,595,977 A * | 6/1986 | von der Ohe | 363/56.11 |
| 4,688,159 A | 8/1987 | Marinus | 363/21 |
| 4,766,528 A | 8/1988 | Marinus | 363/21 |
| 4,914,560 A * | 4/1990 | Oh et al. | 363/56.1 |
| 5,220,271 A * | 6/1993 | Palczynski, Jr. | 323/266 |
| 5,479,087 A * | 12/1995 | Wright | 323/267 |
| 5,689,407 A | 11/1997 | Marinus et al. | 363/21 |
| 5,812,383 A * | 9/1998 | Majid et al. | 363/21.05 |
| 5,859,768 A | 1/1999 | Hall et al. | 363/21 |
| 6,018,467 A * | 1/2000 | Majid et al. | 363/16 |
| 6,026,000 A * | 2/2000 | Buijs et al. | 363/21.06 |
| 6,154,375 A * | 11/2000 | Majid et al. | 363/16 |
| 6,166,926 A * | 12/2000 | Nath et al. | 363/21.03 |
| 6,333,862 B1 * | 12/2001 | Lee et al. | 363/21.01 |
| 6,433,443 B2 * | 8/2002 | Nishida et al. | 307/35 |
| 6,456,509 B1 | 9/2002 | Yasumura | 363/21.02 |
| 6,504,270 B1 * | 1/2003 | Matsushita | 307/140 |
| 6,538,419 B1 * | 3/2003 | Allen et al. | 323/285 |
| 7,304,867 B2 * | 12/2007 | Usui | 363/21.06 |
| 7,400,063 B2 * | 7/2008 | Iwashita | 307/31 |
| 7,855,899 B2 * | 12/2010 | Yang | 363/21.15 |
| 7,911,081 B2 * | 3/2011 | Cyr | 307/31 |
| 2004/0017111 A1 * | 1/2004 | May | 307/31 |
| 2006/0119185 A1 * | 6/2006 | Steigerwald et al. | 307/75 |
| 2009/0008995 A1 * | 1/2009 | Cyr | 307/31 |

OTHER PUBLICATIONS

Juyang Luo, et al., "130W Evaluation Board ovith TDA16850", Infineon Technologies Asia Pacific Pte.Ltd., 14 pages.

(Continued)

*Primary Examiner* — Adi Amrany

(74) *Attorney, Agent, or Firm* — Robert F. Hightower

(57) ABSTRACT

In one embodiment, a power supply system is configured to use a linear regulator to receive a first output voltage and form a regulated voltage during a standby mode and to use the regulated voltage to form another output voltage.

12 Claims, 1 Drawing Sheet

OTHER PUBLICATIONS

Herfurth, "Applications with Monitor-SMPS-Controller TDA 16850", Infineon Technologies, Application Note of Monitor-IC TDA 16850, Jul. 1999, pp. 1-11.

On Semiconductor Data Sheet, TL431, A, B Series, NCV43IA, Semiconductor Components industries, LLC, 2004, Apr. 2004—Rev. 19, pp. 1-18.

* cited by examiner

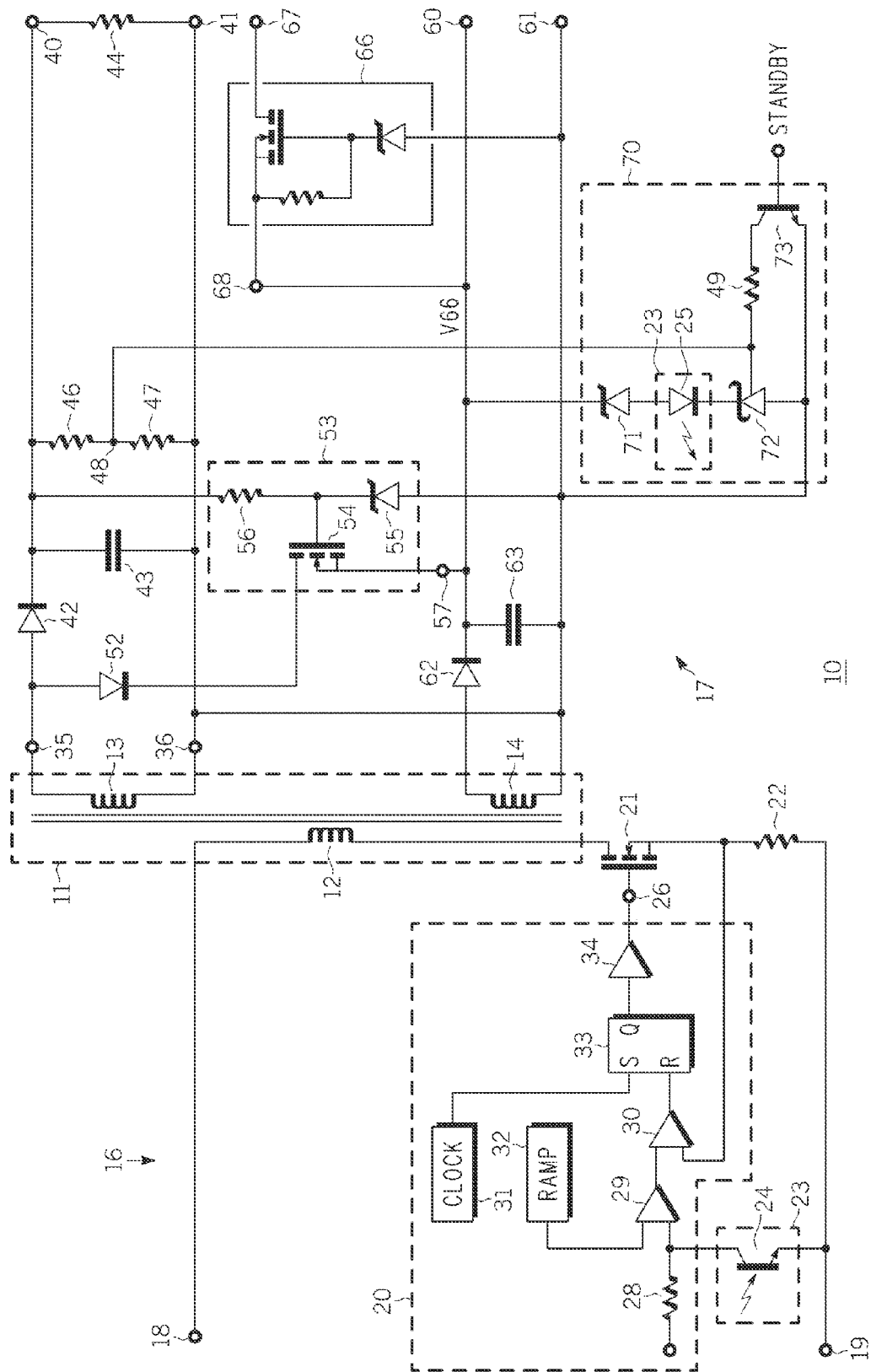

POWER SUPPLY CONTROL METHOD AND STRUCTURE THEREFOR

The present application is a divisional application of prior U.S. application Ser. No. 11/814,656, having a National Stage filing date of Jul. 24, 2007, from International Application no. PCT/US2005/013552 which has a filing date of Apr. 21, 2005, which are both hereby incorporated herein by reference, and priority thereto for common subject matter is hereby claimed.

BACKGROUND OF THE INVENTION

The present invention relates, in general, to electronics, and more particularly, to methods of forming power supply systems and structures.

In the past, the electronics industry utilized various methods and structures to form power supplies that had multiple output voltages. In most cases, a transformer and with multiple secondary windings was used to provide the multiple output voltages. For example in applications such as a television, it was desirable to have a high voltage output that was used for the visual display portion and a lower voltage output that was used for control elements or control logic. It was also desirable to have a standby mode that reduced the voltage on the high voltage output maintained the voltage on the low voltage output so that the control logic operated. One example of such a power supply system was disclosed in U.S. Pat. No. 4,688,159 issued to Antonius Marinus on Aug. 18, 1987. One problem with these prior power supply systems was that control circuitry was required to control the semiconductor switches used for the different operating modes of the system. Additionally, it was difficult to have smooth transitions between the different modes.

Another configuration used a linear regulator connected to one of the high voltage winding. One problem with these prior power supply systems was that if the linear regulator failed it was possible to overheat or damage at least some of the power supply system. In order to reduce the damage, current limiting protection resistors were added to protect the power transistors. However, the current limiting protection resistors cause higher power dissipation in the standby operating mode. Additionally, the protection resistors also limited the minimum voltage to which the output could be reduced which also increased power dissipation. Another way to minimize the damage was to connect the linear regulator to a lower voltage winding, but this also increases the standby power dissipation.

Accordingly, it is desirable to have a power supply system that operates in a standby mode with reduced power dissipation, and that can reduce the value of the high voltage output.

BRIEF DESCRIPTION OF THE DRAWING

The sole FIGURE schematically illustrates an embodiment of a portion of a power supply system in accordance with the present invention.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention.

DETAILED DESCRIPTION OF THE DRAWINGS

The sole FIGURE schematically illustrates an embodiment of a portion of a power supply system 10 that generates multiple output voltages. System 10 includes a transformer 11 that partitions system 10 into a primary side 16 and a secondary side 17. System 10 has two operating modes, a normal mode and a standby mode, that are selected by the state of a standby signal. The source of the standby signal is not shown in the sole FIGURE but may be a variety of sources depending on the application for system 10. For example, system 10 may be a power supply system of a television and the standby signal may be generated by a microprocessor or other control logic (not shown). Transformer 11 includes a primary winding 12, a first secondary winding or main secondary winding 13, and a second secondary winding or auxiliary secondary winding 14. Although two secondary windings are illustrated, those skilled in the art will appreciate that transformer 11 may have more than two secondary windings. Winding 13 generally functions as a main output and typically forms a first secondary voltage or secondary voltage between a first output 40 and a first return 41 of side 17. Second secondary winding 14 generally is used to supply a first auxiliary voltage or auxiliary voltage between an output 60 and a return 61 of side 17. The auxiliary voltage generally is a lower voltage value than the secondary voltage on output 40. For example, the auxiliary voltage may be used to power a microprocessor or other control logic while the secondary voltage from winding 13 may be used for a visual display device, such as a CRT, or other higher voltage device.

Primary side 16 typically receives power, such as a rectified dc voltage, between a power input terminal 18 and a power return terminal 19 that are coupled to primary winding 12. A first terminal of primary winding 12 generally is connected to terminal 18 to receive the input voltage and a second terminal of winding 12 is connected to a power switch or power transistor 21 that is utilized to control the current flow through winding 12 and the energy coupled to windings 13 and 14. Transistor 21 is controlled by a primary side switching power supply controller 20 such as a pulse width modulated (PWM) controller or a quasi-resonant controller. An optional current sense resistor 22 may be connected in series between transistor 21 and return terminal 19 in order to provide a current sense signal to controller 20 that is representative of the current flowing through transistor 21. An optical coupler 23 generally is utilized to provide a primary side feedback (FB) signal or primary feedback (FB) to controller 20 in order to assist in regulating the voltages provided by system 10 as will be seen further hereinafter. Optical coupler 23 has an optical transistor 24 that provides the primary FB to controller 20 and an optical emitter 25 that is connected in secondary side 17. Those skilled in the art will appreciate that the embodiment of coupler 23 is one example of a method of providing a feedback signal and that other well known embodiments may also be used.

Controller 20 generally includes an error amplifier 29, a PWM comparator 30, a clock generator or clock 31, a ramp generator or ramp 32, a PWM latch 33, and an output driver 34. Controller 20 receives the primary FB and forms a switching drive signal on an output 26 that is used to control transistor 21 and regulate the value of the secondary voltage formed between output 40 and return 41. One example of a suitable implementation of controller 20 is disclosed in U.S. Pat. No. 5,859,786 issued to Hall et al on Jan. 12, 1999. Those skilled in the art will appreciate that the embodiment of controller 20 is one example of a method of forming the switching drive signal to regulate the secondary voltage and that other well known embodiments may also be used. For example, controller 20 may be a quasi-resonant controller instead of a fixed frequency PWM controller.

Secondary side 17 includes a first output channel that is coupled to winding 13 and a second output channel that is coupled to second secondary winding 14. The first and second channels form the respective secondary voltage and auxiliary voltage as rectified dc voltages between respective pairs of output 40 and return 41 and output 60 and return 61. The first output channel functions to form the secondary voltage between output 40 and return 41 and includes winding 13, a first blocking device such as a diode 42, a filter capacitor 43, output 40 and return 41. Diode 42 receives the output voltage from terminal 35 of winding 13 and couples the output voltage to output 40. Diode 42 also prevents current flow from secondary side 17 into winding 13. Filter capacitor 43 filters the voltage from diode 42 to minimize ripple in the secondary voltage. A resistor 44 is used to illustrate a load that may be powered by the secondary voltage. However the load is not limited to pure resistive loads. The second output channel functions to form the auxiliary voltage between output 60 and return 61 and includes winding 14, a second blocking device such as a diode 62, a filter capacitor 63, output 60 and return 61. Diode 62 receives the output voltage from winding 14 and couples the output voltage to output 60. Diode 62 also prevents current flow from secondary side 17 into winding 14. Filter capacitor 63 filters the voltage from diode 62 to minimize ripple in the auxiliary voltage. The turns-ratio of winding 12 to windings 13 and 14 influences the value of the voltages. Typically winding 14 has fewer turns than winding 13, thus, the value of the secondary voltage typically is greater than the value of the auxiliary voltage. A feedback network is connected between output 40 and return 41 in order to form a secondary side feedback voltage or secondary feedback (FB) voltage that is representative of the value of the secondary voltage between output 40 and return 41. In the preferred embodiment, the feedback network includes a resistor divider that forms the value of the secondary FB voltage proportionally to the value of the secondary voltage. The resistor divider includes a resistor 46 that is connected in series with a resistor 47 and coupled between output 40 and return 41. A feedback node 48 at a common connection between resistors 46 and 47 provides the secondary FB voltage.

Secondary side 17 also includes a feedback control circuit 70, a secondary regulator 66, and a standby pre-regulator 53. Secondary regulator 66 generally is connected between output 60 and return 61 to receive the auxiliary voltage and form a first regulated output voltage or regulated voltage between a regulated output 67 and return 61. Regulator 66 preferably is a linear voltage regulator and forms the value of the regulate voltage less than the value of the auxiliary voltage. Regulator may be implemented as any of a variety of well known regulator circuits. One example of a linear regulator circuit is illustrated within the box denoted as regulator 66, however, the illustrated implementation is only one example of a suitable regulator implementation.

As will be seen further hereinafter, standby pre-regulator 53 is configured as a linear regulator that is used during the standby mode to supply an input voltage to an input 68 of regulator 66 when the auxiliary voltage supplied by winding 14 is less than the minimum required input voltage for operating regulator 66. Standby pre-regulator 53 includes a blocking device, such as a diode 52, a pass transistor 54, and a voltage reference, such as a zener diode 55 and a biasing resistor 56. Pre-regulator 53 is coupled to receive the output voltage from terminal 35 of winding 13 and to form a regulated standby voltage on an output 57 of pre-regulator 53 that is coupled to output 60. Feedback control circuit 70 includes a biasing diode 71, optical emitter 25 of optical coupler 23, standby switch or transistor 73, resistor 49, and reference regulator 72. Reference regulator 72 may be a reference generator and shunt regulator, such as a TL431, that is well known to those skilled in the art. Reference generators and shut regulator devices such as the TL431 are available from a variety of manufacturers including ON Semiconductor of Phoenix Ariz.

When operating in the normal mode, the standby signal received by circuit 70 is high, thus, transistor 73 is enabled. Transistor 73 couples resistor 49 in parallel with resistor 47 to establish a proportionality ratio between the secondary voltage and the secondary FB voltage. The secondary FB voltage from node 48 is received by regulator 72. Regulator 72 has an internal reference voltage and forms an error signal output that is representative of the difference between the secondary FB voltage and the internal reference voltage of regulator 72. The value of the error signal on the output of regulator 72 controls the amount of current flowing from output 60 through diode 71 and optical emitter 25, thus, the primary FB value received by controller 20. As the value of the secondary FB voltage increases above the value of the reference voltage of regulator 72, the value of the error signal increases thereby increasing the current through emitter 25 and decreasing the primary FB value received by controller 20. Controller 20 responsively forms the primary drive signal on output 26 to reduce the on-time of transistor 21 and regulate the value of the secondary voltage between output 40 and return 41. If the value of the secondary FB voltage decreases below the value of the reference voltage of regulator 72, the value of the error voltage becomes more negative thereby decreasing the current through emitter 25 and increasing the primary FB value received by controller 20. Controller 20 forms the primary drive signal to increase the on-time of transistor 21 and regulate the value of the secondary voltage. Controlling the value of the secondary voltage also results in system 10 forming the auxiliary voltage on output 60. The value of the auxiliary voltage is ratioed to the secondary voltage by the turns ratio of transformer 11. Regulator 66 receives the auxiliary voltage and forms the regulated voltage on output 67. Those skilled in the art will appreciate that the feedback signal illustrated is one example of a method of forming the feedback signal and that other well known embodiments may also be used. For example, the feedback signal may be a current instead of a voltage thus the primary feedback may vary differently as long as the power is increased for an increase in power required by load 44.

In the normal operating mode, pre-regulator 53 is disabled. The value of the standby voltage from pre-regulator 53 is chosen to be large enough to provide an input voltage for operating regulator 66 but is less than the auxiliary voltage on output 60 when system 10 in the normal operating mode. Thus, the source of transistor 54 is at a higher voltage than the gate and transistor 54 is disabled and does not provide any current the output 60. For example, the secondary voltage may be a rectified dc voltage of about one hundred forty-five volts (145 V) and the resulting auxiliary voltage may be a rectified dc voltage of about twelve volts. Regulator 66 may form a regulated dc voltage of about five volts (5V) and the standby voltage of pre-regulator 53 may be about 7.5 volts.

In the standby mode, system 10 reduces the value of the secondary voltage and the auxiliary voltage in order to reduce the power dissipation of the system that uses system 10. However, it generally is desirable to maintain the regulated voltage on output 67 substantially unchanged. When the standby signal goes to a low value, system 10 begins changing to the standby operating mode. Circuit 70 responsively changes the proportionality ratio between the secondary voltage and the secondary FB voltage to cause system 10 to reduce both the secondary voltage and the auxiliary voltage to the respective standby values thereof. The low standby signal disables transistor 73 thereby removing resistor 49 from the parallel connection with resistor 47 thereby changing the proportionality ratio that is used to form the secondary FB voltage at node 48. The value of resistor 49 typically is much lower than the value of resistor 47 in order to provide a large change in the proportionality ratio and increase the value of the secondary FB voltage applied to regulator 72. Increasing the value of the secondary FB voltage increases the difference between the secondary FB voltage and the reference voltage of regulator 72 thereby increasing the value of the error signal from regulator 72. The increased error signal increases the current through emitter 25 thereby decreasing the primary feedback signal applied to controller 20 causing controller 20 to responsively reduce the on-time of transistor 21 to allow the value of the secondary voltage to decrease. Controller 20 preferably disables transistor 21 until the value of the secondary voltage decreases to the standby value corresponding to the secondary FB voltage reducing to substantially the value of the reference voltage of regulator 72. When the secondary FB voltage again is approximately equal to the reference voltage, controller 20 will regulate the secondary voltage and the auxiliary voltage at values that are much less than the values during the normal operating mode. The reduced values are equal to the change in the proportionality ratio resulting from enabling transistor 73 times the respective voltage values during the normal operating mode. Typically, the value of the secondary voltage in the standby mode is chosen to be at least larger than the minimum voltage required to operate regulator 66 (V66) and is much less than the secondary voltage value in the normal mode. The value of the auxiliary voltage in the standby mode is generally much lower than the minimum voltage required to operate regulator 66 (V66). In the preferred embodiment, the values of the secondary voltage and the auxiliary voltage in the normal mode are approximately one hundred forty five volts (145 V) and twelve volts (12 V) respectively. In the standby mode they are approximately twelve volts (12 V) and one volt (1.0 V), respectively. The preferred minimum voltage required to operate regulator 66 (V66) is about 7.5 volts.

During the transition period between the normal mode and the standby mode after controller disables transistor 21 and the secondary voltage is decreasing from the normal value to the standby value, no energy is coupled into windings 13 and 14 which allows the value of the respective voltages on outputs 40 and 60 to begin decreasing. Regulator 66 uses the stored energy in capacitor 63 and continues to provide the regulated voltage on output 67 as long as the auxiliary voltage is high enough for regulator 66 to operate. Since no energy is coupled into windings 13 and 14 there may be insufficient energy to maintain operating regulator 66. In order to provide some energy to windings 13 and 14, circuit 70 is configured to provide a primary FB that causes controller 20 to enable transistor 21 at least a portion of the time while the secondary voltage is decreasing to the standby value. If the value of the auxiliary voltage decreases below the minimum value required to operate regulator 66 (V66), circuit 70 inhibits current flow through emitter 25 causing controller 20 to responsively operate transistor 21 to couple energy into windings 13 and 14. The value of the zener voltage of diode 71 is chosen to ensure such operation. The zener voltage of diode 71 is chosen to be approximately equal to V66 minus the voltage drop across emitter 25 minus the reference voltage of regulator 72. AS will be seen further hereinafter, circuit 70 is typically set to a voltage that is less than the standby voltage of pre-regulator 53 to minimize conflicts between the control loops of secondary side 17. Those skilled in the art will understand that diode 71 may be omitted if sufficient power is available to operate regulator 66 during the transition period.

For example, if V66 is about 7.5 volts, and if the reference voltage of regulator 72 is about 2.5 volts, and if the drop of emitter 25 is about 1.2 volts, then the voltage of diode 71 may be about 3.8 volts (7.5-2.5-1.2=3.8). Typically, the voltage of diode 71 is set just less than this, for example 3.5 volts to prevent control loop conflicts. For this example of 3.5 volts, if the auxiliary voltage decreases below 7.2 volts, no current flows through emitter 25 causing the primary FB to increase to a maximum value thereby causing controller 20 to begin switching transistor 21 and couple energy into windings 13 and 14. The energy from windings 13 and 14 increases the secondary voltage and the auxiliary voltage and charges capacitors 43 and 63. Controller 20 continues to operate transistor 21 responsively to the primary FB until the auxiliary voltage reaches about 7.3 volts causing current to again flow through emitter 25.

As the standby mode switching of transistor 21 charges capacitor 43, the secondary voltage also increases the secondary voltage. At some point, the secondary voltage from winding 13 is sufficient to enable pre-regulator 53 to supply the standby voltage on output 57 to output 60 and regulator 66. Pre-regulator 53 is configured to couple a regulated voltage that is no less than V66 to the input of regulator 66. The value of the reference voltage supplied by diode 55 is chosen to be approximately equal to the value of V66 minus the threshold voltage of transistor 54. Resistor 56 supplies a bias current to operate diode 55 and drop the difference between the reference voltage of diode 55 and the secondary voltage value in the standby mode. After the value of the auxiliary voltage on output 60 decreases to or below the value of the standby voltage, the source of transistor 54 becomes lower than the diode 55 reference voltage minus the threshold voltage of transistor 54 thereby enabling transistor 54 to couple the standby voltage to the input of regulator 66. As can be seen, if the voltage of diode 71 is too high, circuit 70 may prevent pre-regulator 53 from being enabled. Thus, the voltage of diode 71 is generally chosen so that circuit 70 enables controller 20 at a voltage that is less than the standby voltage. Regulator 66 utilizes this standby voltage as an input voltage to form the regulated voltage on output 67. Diode 52 of pre-regulator 53 connects pre-regulator 53 to terminal 35 of winding 13 to receive the energy directly from winding 13 and functions as a rectifier similarly to diode 42. Diode 52 also isolates pre-regulator 53 from output 40. Consequently, if regulator 53 is shorted, diode 52 prevents the high voltage from output 40 damaging the low voltage portion of secondary side 17 including regulator 66, circuit 70, and other circuits connected to output 60. Thus, regulator 66 continues to supply the regulated voltage to output 67 and the control logic continues to operate. For example, transistor 54 may short and connect diode 52 to output 60. If diode 52 were omitted and regulator 53 connected to output 40, the high voltage from output 40 would have been applied to output 60 and would have damaged the low voltage portion of secondary side 17. Thus, this connection of diode 52 provides an advantage not realized by prior art implementations.

In order to facilitate this functionality of system 10, terminal 35 of winding 13 is commonly connected to an anode of diode 42 and an anode of diode 52. A cathode of diode 42 is commonly connected to output 40, to a first terminal of capacitor 43, to a control input of pre-regulator 53, and to a first terminal of resistor 46. Return 41 is commonly connected to a first terminal of resistor 47, a second terminal of capacitor 43, and a second terminal of winding 13. A second terminal of resistor 47 is connected to a second terminal of resistor 46 and to node 48. A cathode of diode 52 is connected to an input of pre-regulator 53 and to a drain of transistor 54. A source of transistor 54 is connected to outputs 57 and 60, and a gate of transistor 54 is commonly connected to a cathode of diode 55 and a first terminal of resistor 56 which has a second terminal connected to the control input of pre-regulator 53. An anode of diode 55 is connected to return 61. Output 60 is connected to input 68 of regulator 66, a first terminal of capacitor 63, and a cathode of diode 62. An anode of diode 62 is connected to a first terminal of winding 14. Return 61 is connected to a return of regulator 66, a second terminal of capacitor 63, and a second terminal of winding 14. An output of regulator 66 is connected to output 67. A cathode of diode 71 is connected to output 60 and an anode of diode 71 is connected to an anode of emitter 25. A cathode of emitter 25 is connected to the output of regulator 72. A return of regulator 72 is connected to return 61. An input of regulator 72 is connected to node 48 and to a first terminal of resistor 49. A second terminal of resistor 49 is connected to a collector of transistor 73. An emitter transistor 73 is connected to return 61, and a base of transistor 73 is connected to receive the standby signal.

In view of all of the above, it is evident that a novel circuit and method is disclosed. Included, among other features, is forming an auxiliary voltage that is sufficient for operating a low voltage regulator in both a standby and normal operating mode of a power supply system. Coupling a linear regulator to form a standby voltage that is sufficient for operating the low voltage regulator reduces the power dissipation n the standby mode. Isolating the linear regulator from the secondary output prevents damaging the power supply system in case of a short circuit of the linear regulator.

While the invention is described with specific preferred embodiments, it is evident that many alternatives and variations will be apparent to those skilled in the semiconductor arts. Although a preferred embodiment of the pre-regulator is described, other implementations are possible that provide the same regulated standby voltage. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A power supply system comprising:
   a transformer having a primary winding, a first secondary winding with a first terminal of the first secondary winding coupled to a first secondary output of the power supply system, and having a second secondary winding coupled to a first low voltage output of the power supply system;
   a switching power supply controller coupled to control the primary winding to form a first output voltage on the first secondary winding and to form a second output voltage on the second secondary winding;
   a first blocking device configured to couple the first output voltage to the first secondary output of the power supply system as a secondary voltage;
   a second blocking device configured to couple the second output voltage to the first low voltage output of the power supply system as an auxiliary voltage; and
   a first regulator configured to operate as a linear voltage regulator that is coupled between the first secondary winding and the first low voltage output to receive the first output voltage from the first secondary winding and supply a first regulated voltage to the first low voltage output that has a lower value than the secondary voltage, the first regulator including a third blocking device coupled to receive the first output voltage from the first secondary winding and a series pass transistor configured to operate as the series pass transistor of the linear voltage regulator and coupled in series with the third blocking device between the first secondary winding and the second secondary winding to receive a voltage from the third blocking device and regulate a value of the first regulated voltage.

2. The power supply system of claim 1 wherein the first blocking device is a first diode coupled in series between the first terminal of the first secondary winding and the first secondary output of the power supply system, the second blocking device is a second diode coupled in series between the second secondary winding and the first low voltage output of the power supply system, and the third blocking device is a third diode coupled in series between the first terminal of the first secondary winding and an input to the first regulator.

3. The power supply system of claim 1 further including a second regulator coupled to receive the first regulated voltage from the first regulator and supply a second regulated voltage on a second low voltage output of the power supply system.

4. The power supply system of claim 1 further including a feedback control circuit configured to provide a feedback signal to regulate the secondary voltage to a first value during a first operating mode of the power supply system and to regulate the secondary voltage to a second value that is less than the first value during a second operating mode of the power supply system.

5. The power supply system of claim 4 wherein the feedback control circuit includes a resistor divider coupled to the first secondary output of the power supply system to receive the secondary voltage and coupled to provide a feedback voltage to an input of an error amplifier, the feedback control circuit also including a first resistor configured for coupling in parallel with one resistor of the resistor divider, an optical coupler coupled to receive an output of the error amplifier, and a zener diode coupled between the optical coupler and the first low voltage output of the power supply system.

6. The power supply system of claim 1 wherein the power supply system is configured to form a first feedback voltage value that is representative of a first value of the secondary voltage during a first operating mode and to responsively control the switching power supply controller to regulate the secondary voltage to the first value of the secondary voltage and wherein the power supply system is configured to form the first feedback voltage value representative of a second value of the secondary voltage responsively to operating in a second operating mode to responsively control the switching power supply controller to regulate the secondary voltage to the second value of the secondary voltage responsively to operating in the second operating mode wherein the second value of the secondary voltage is less than the first value of the secondary voltage.

7. The power supply system of claim 1 wherein the series pass transistor of the linear voltage regulator is enabled in response to a difference in voltage between the secondary voltage and the auxiliary voltage.

8. A power supply system comprising:
- a transformer having a primary winding, a first secondary winding with a first terminal of the first secondary winding coupled to a first secondary output of the power supply system, and having a second secondary winding coupled to a first low voltage output of the power supply system;
- a switching power supply controller coupled to control the primary winding to form a first output voltage on the first secondary winding and to form a second output voltage on the second secondary winding;
- a first blocking device configured to couple the first output voltage to the first secondary output of the power supply system as a secondary voltage;
- a second blocking device configured to couple the second output voltage to the first low voltage output of the power supply system as an auxiliary voltage; and
- a first regulator coupled to receive the first output voltage from the first secondary winding and supply a first regulated voltage to the first low voltage output of the power supply system wherein the first regulator is a linear regulator, the first regulator further including a pass transistor coupled to the first terminal of the first secondary winding to receive the first output voltage and coupled to receive a first reference voltage, the first pass transistor configured to be enabled responsively to a first difference between the secondary voltage and the auxiliary voltage.

9. A power supply method comprising:
- configuring a power supply system with a transformer having a primary winding, a first secondary winding having a first terminal coupled to a secondary output of the power supply system, and a second secondary winding coupled to an auxiliary output of the power supply system;
- configuring a power supply controller to control the primary winding and to operate in a normal operating mode and regulate a secondary voltage on he secondary output to a first value and form an output voltage on the first terminal of the first secondary winding wherein regulating the secondary voltage regulates an auxiliary voltage on the auxiliary output to a second value;
- configuring the power supply controller to operate in a stand-by operating mode and regulate the secondary voltage to a third value that is less than the first value including coupling a linear voltage regulator to receive the output voltage and regulate it to a first regulated voltage and couple the first regulated voltage to the auxiliary output wherein the first regulated voltage is less than the third value including isolating the linear regulator from the secondary voltage;
- configuring the power supply controller to use the first regulated voltage to form a second regulated voltage during the standby operating mode wherein the second regulated voltage is less than the first regulated voltage; and
- configuring the power supply controller to regulate a value of the auxiliary voltage to a fourth value that is no greater than the first regulated voltage for a portion of a transition period between operating in the standby operating mode and operating in the normal operating mode.

10. The method of claim 9 wherein configuring the power supply controller to regulate the value of the auxiliary voltage to the fourth value that is no greater than the first regulated value for the portion of the transition period includes forming a feedback signal coupled to operate a switching power supply controller to control current through the primary winding responsively to the value of the auxiliary voltage.

11. The method of claim 9 wherein configuring the power supply controller to regulate the value of the auxiliary voltage to the fourth value that is no greater than the first regulated value for the portion of the transition period includes coupling energy into the second secondary winding after the auxiliary voltage decreases to less than the first regulated voltage.

12. The method of claim 11 wherein
configuring the power supply controller to operate in the normal operating mode and regulate the secondary voltage on the secondary output to the first value includes regulating the secondary voltage on the secondary output responsively to the power supply system operating in the normal operating mode or in the standby operating mode.

* * * * *